US008104005B2

(12) United States Patent
Sinha et al.

(10) Patent No.: US 8,104,005 B2
(45) Date of Patent: Jan. 24, 2012

(54) METHOD AND APPARATUS FOR EFFICIENT INCREMENTAL STATISTICAL TIMING ANALYSIS AND OPTIMIZATION

(75) Inventors: Debjit Sinha, Wappingers Falls, NY (US); Natesan Venkateswaran, Hopewell Junction, NY (US); Chandramouli Visweswariah, Croton-on-Hudson, NY (US); Jinjun Xiong, White Plains, NY (US); Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 12/244,512

(22) Filed: Oct. 2, 2008

(65) Prior Publication Data

US 2010/0088658 A1    Apr. 8, 2010

(51) Int. Cl.
*G06F 17/50* (2006.01)
(52) U.S. Cl. .................................................. 716/108
(58) Field of Classification Search .................. 716/100, 716/108
See application file for complete search history.

(56) References Cited

U.S. PATENT DOCUMENTS

| 5,508,937 A * | 4/1996 | Abato et al. ................... 716/134 |
| 6,880,142 B2 | 4/2005 | Cui et al. |
| 7,350,171 B2 | 3/2008 | Zhang et al. |
| 7,508,893 B1 * | 3/2009 | Gan et al. ....................... 375/355 |
| 8,005,660 B2 * | 8/2011 | Chiu et al. ....................... 703/14 |
| 2007/0089077 A1 | 4/2007 | Sumikawa |
| 2007/0113211 A1 * | 5/2007 | Zhang et al. ...................... 716/6 |
| 2007/0277134 A1 | 11/2007 | Zhang et al. |
| 2008/0072198 A1 | 3/2008 | Celik et al. |
| 2010/0162064 A1 * | 6/2010 | Shi et al. ........................ 714/738 |

FOREIGN PATENT DOCUMENTS

| JP | 08-129568 | 5/1996 |
| JP | 2003-288379 | 10/2003 |
| JP | 2007-109138 | 4/2007 |

* cited by examiner

*Primary Examiner* — Suchin Parihar

(57) ABSTRACT

In one embodiment, the invention is a method and apparatus for efficient incremental statistical timing analysis and optimization. One embodiment of a method for determining an incremental extrema of n random variables, given a change to at least one of the n random variables, includes obtaining the n random variables, obtaining a first extrema for the n random variables, where the first extrema is an extrema computed prior to the change to the at least one of the n random variables, removing the at least one of the n random variables to form an (n−1) subset, computing a second extrema for the (n−1) subset in accordance with the first extrema and the at least one of the n random variables, and outputting a new extrema of the n random variables incrementally based on the extrema of the (n−1) subset and the at least one of the n random variables that changed.

24 Claims, 4 Drawing Sheets

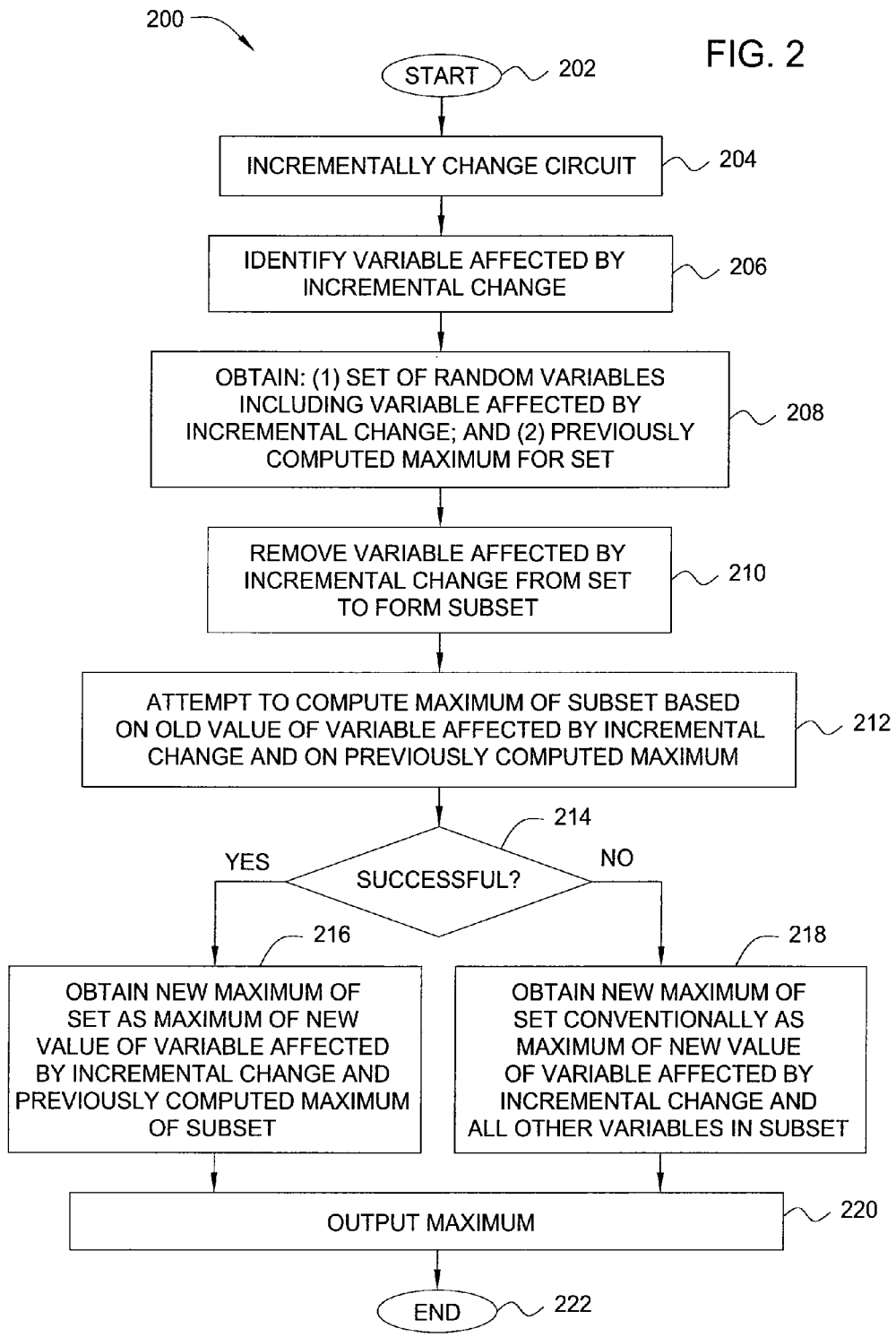

METHOD AND APPARATUS FOR EFFICIENT INCREMENTAL STATISTICAL TIMING ANALYSIS AND OPTIMIZATION

BACKGROUND OF THE INVENTION

The present invention relates generally to design automation, and relates more particularly to statistical timing of integrated circuit (IC) chips.

As part of statistical timing, a static timing analysis tool needs to compute the extrema (i.e., maximum and/or minimum) of several random variables that represent timing data. FIG. 1A, for example, is a schematic diagram illustrating a NAND gate 100 with three inputs A, B, and C and output Z. The latest arrival time at the output Z (i.e., $AT_Z$) is computed as the statistical maximum of the arrival times of signals from the inputs A, B, and C (i.e., $AT_A$, $AT_B$, and $AT_C$, respectively).

During the chip timing closure process, and especially during fix-up or optimization, incremental changes (e.g., buffer insertion, pin swapping, layer assignment, cell sizing, etc.) are made to the IC chip. Typically, the timing data at only one of the inputs on which the extrema needs to be computed at any given timing point is changed; however, the change must be propagated. FIG. 1B, for example, is a schematic diagram illustrating the insertion of a buffer 102 at one of the inputs (i.e., input A) to the NAND gate 100 of FIG. 1A. The insertion of the buffer 102 requires the timing analysis tool to re-compute the arrival time at the output Z (i.e., $AT_Z^{new}$, or the statistical maximum of the arrival times $AT_A^{new}$, $AT_B$, and $AT_C$).

Conventional timing analysis methods force a re-computation of the maximum of all of the input timing data. This is computationally very expensive, especially when the number of input random variables that represents the timing data is very large (e.g., as in the case of several signals from a multiple-input gate propagating to the output, or a multiple fan-out net emanating from a single output pin of a gate). Even where only one of the inputs has changed (e.g., as in FIG. 1B), the timing analysis tool is forced to re-compute the extrema of all inputs, including those inputs that are unchanged. For an optimization tool making millions of incremental changes in a large design, this re-computation of unchanged input data is very inefficient and leads to waste of machine resources.

Thus, there is a need in the art for a method and apparatus for efficient incremental statistical timing analysis and optimization.

SUMMARY OF THE INVENTION

In one embodiment, the invention is a method and apparatus for efficient incremental statistical timing analysis and optimization. One embodiment of a method for determining an incremental extrema of n random variables, given a change to at least one of the n random variables, includes obtaining the n random variables, obtaining a first extrema for the n random variables, where the first extrema is an extrema computed prior to the change to the at least one of the n random variables, removing the at least one of the n random variables to form an (n−1) subset, computing a second extrema for the (n−1) subset in accordance with the first extrema and the at least one of the n random variables, and outputting a new extrema of the n random variables incrementally based on the extrema of the (n−1) subset and the at least one of the n random variables that changed.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 is a flow diagram illustrating one embodiment of a method for incrementally computing a maximum value of a set of random variables, given a change to at least one of the random variables, according to the present invention;

DETAILED DESCRIPTION

In one embodiment, the present invention is a method and apparatus for efficient incremental statistical timing analysis and optimization. Given a set of n random variables and the previously computed extrema of these n random variables, embodiments of the invention efficiently compute the extrema of any subset of (n−1) of the random variables. This is used to incrementally compute a new extrema of the n random variables, given a change to at least one of the n variables. Although embodiments of the invention are described below in terms of computing a maximum value, those skilled in the art will appreciate that the concepts of the present invention may equally be applied to compute a minimum value without loss in generality.

As is understood in the field of statistical timing, timing data (such as arrival times) may be represented by random variables with a known (e.g., Gaussian) distribution. Maximum and minimum operations are typically performed two at a time, such that (n−1) operations are performed for n operands. For instance, the statistical maximum of ($AT_A$, $AT_B$, and $AT_C$) is computed by first computing $\max(AT_A, AT_B)=X$, then computing $\max(X, AT_C)$.

FIG. 2 is a flow diagram illustrating one embodiment of a method 200 for incrementally computing a maximum value of a set of random variables, given a change to at least one of the random variables, according to the present invention. Although the method 200 is discussed in terms of the computation of a maximum value from the subset, those skilled in the art will appreciate that the method 200 may likewise be applied to compute a minimum value from the subset.

Figure 1A:
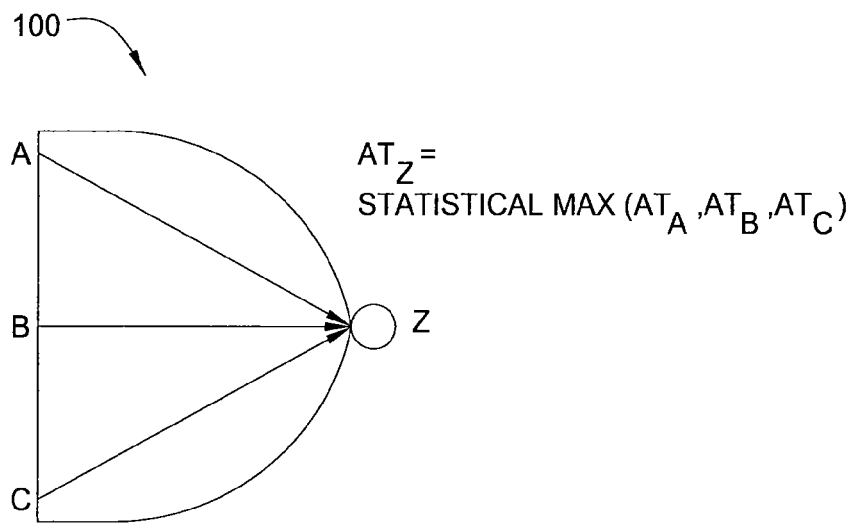
FIG. 1A is a schematic diagram illustrating a NAND gate with three inputs.
Figure 1B:
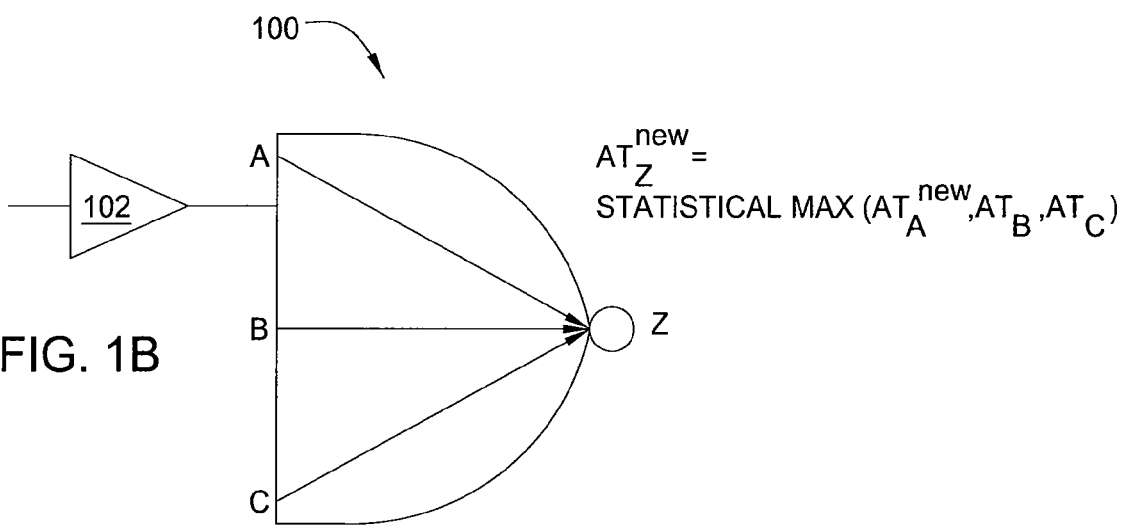
FIG. 1B is a schematic diagram illustrating the insertion of a buffer at one of the inputs to the NAND gate of FIG. 1A.

The method 200 is initialized at step 202 and proceeds to step 204, where the method 200 makes an incremental change to a circuit (e.g., buffer insertion, pin swapping, layer assignment, cell sizing, or the like). In step 206, the method 200 identifies the variable that is affected by the incremental change. For instance, in the example of FIG. 1B, the incremental change of adding the buffer 102 at input A changed the variable $AT_A$ to $AT_A^{new}$.

In step 208, the method 200 obtains a set of n random variables $\{X_1, X_2, \ldots, X_n\}$ and a previously computed maximum $Y=\max(X_1, X_2, \ldots, X_n)$ for the set of n random variables. The set of n random variables includes the variable that is affected by the incremental change, which is denoted as $X_k$ prior to the incremental change and $X_k^{new}$ after the incremental change.

In step 210, the method 200 removes the variable $X_k$ from the set of n random variables such that an (n−1) subset is formed as $\{X_1, \ldots, X_{k-1}, X_{k+1}, \ldots, X_n\}$.

In step 212, the method 200 attempts to compute the maximum of the subset $\{X_1, \ldots, X_{k-1}, X_{k+1}, \ldots, X_n\}$, based on knowledge of the previously computed maximum Y and the removed variable $X_k$. In one embodiment, the new maximum of the n random variables is computed incrementally as follows.

First, a value $X^{partial}$ is efficiently computed from Y and $X_k$ as the maximum of the subset, i.e., $X^{partial}=\max(X_1, \ldots, X_{k-1}, X_{k+1}, \ldots, X_n)$. The method 200 then proceeds to step 214 and determines whether $X^{partial}$ was computed successfully.

If the method 200 concludes in step 214 that $X^{partial}$ was computed successfully from Y and $X_k$, the new maximum, $Y^{new}$, is computed in step 216 as the maximum of $X^{partial}$ and $X_k^{new}$, i.e., $Y^{new}=\max(X^{partial}, X_k^{new})$. The mathematics of these operations is discussed in greater detail below. Alternatively, if the method 200 concludes in step 214 that $X^{partial}$ cannot be computed efficiently from Y and $X_k$, $Y^{new}$ is computed in step 218 using a conventional method for re-computing the maximum of all of the n random variables (i.e., $Y^{new}=\max(X_1, \ldots, X_{k-1}, X_k^{new}, X_{k+1}, \ldots, X_n)$).

Having computed $Y^{new}$ in accordance with either step 216 or step 218, the method 200 proceeds to step 220 and outputs a new maximum value, $Y^{new}$, representing the incremental maximum value of the n random variables (i.e., $Y^{new}=\max(X_1, \ldots, X_{k-1}, X_k^{new}, X_{k+1}, \ldots, X_n)$). The method 200 then terminates in step 222.

Embodiments of the invention therefore efficiently and incrementally compute the new extrema of n random variables. Whereas conventional techniques require (n−1) pair-wise maximum operations to compute $Y^{new}=\max(X_1, \ldots, X_k^{new}, \ldots, X_n)$, the method 200 requires only one pair-wise maximum operation to compute $Y^{new}=\max(X_{partial}, X_n^{new})$. Specifically, the computation of $X^{partial}$ requires less than two pair-wise maximum operations (i.e., one pair-wise maximum operation plus two addition operations, as discussed below). The method 200 is therefore extremely efficient, especially when more than three random variables are contained in the set of random variables. In particular, a run-time gain factor of greater than (n−1)/3 can be obtained over conventional methods.

Moreover, although methods exist for computing reversible tightness probabilities (e.g., for yield gradient computations), these methods do not perform incremental extrema operations (e.g., as applied to incremental statistical timing and optimization), as taught by the present invention. Embodiments of the present invention provide a unique and mathematically simplified method for performing reversible extrema operations. Further novel applications of the present invention include the prediction of incremental yields.

In further embodiments of the present invention, the method 200 can be applied iteratively to compute the incremental maximum of n input variables when more than one input variable is changed. In such embodiments, the method 200 is applied iteratively, dropping one random variable each time.

For ease of explanation, the mathematics involved in operation of the method 200 focuses herein, without any loss of generality, on a reversible statistical max operation and on two Gaussian random variables $X_1 \sim N(\mu_1, \sigma_1^2)$ and $X_2 \sim N(\mu_2, \sigma_2^2)$, respectively. It is assumed that $X_1$ and $X_2$ have a jointly normal distribution. The maximum (max) of these Gaussians $X_1$ and $X_2$ is denoted as another Gaussian, namely, $X_m \sim N(\mu_m, \sigma_m^2)$. Thus, given the Gaussians $X_1$ and $X_m$, the present invention seeks to reconstruct $X_2$.

Some fundamental operations on the max operation are as follows:

$$\max(X_1, X_2) = X_m \quad \text{(EQN. 1)}$$

$$\Rightarrow \max(X_1-X_1, X_2-X_1) = X_m - X_1 \quad \text{(EQN. 2)}$$

$$\Rightarrow \max(0, X_2-X_1) = X_m - X_1 \quad \text{(EQN. 3)}$$

Thus, it can be stated that if $X_1$ strictly dominates $X_2$ (i.e., $\Pr(X_1 \geq X_2)=1$), then $\max(0, X_2-X_1)$ is zero, and $X_2$ cannot be reconstructed. In this case, $X_2$ does not play a role in computation of $X_m$, and, therefore, a reversible max operation may have infinitely many solutions for $X_2$, where each solution satisfies $\Pr(X_1 \geq X_2)=1$. Such a scenario is indicated as an unsuccessful computation in step 214 of the method 200.

When $X_1$ does not strictly dominate $X_2$, $X_2$ may be reconstructed using the following approach. For ease of notation, $X_2-X_1$ is denoted as a Gaussian $X \sim N(\mu, \sigma^2)$, and $X_m - X_1$ is denoted as another Gaussian $X_0 \sim N(\mu_0, \sigma_0^2)$. It is attempted to reconstruct X from $X_0$ (it is noted that $\mu_0$ and $\sigma_0$ are known). Once X is reconstructed, it is trivial to obtain $X_2$.

Based on EQN. 3, one has:

$$\max(0, X) = X_0 \quad \text{(EQN. 4)}$$

Employing the approach proposed by Visweswariah et al. in "First-order incremental block-based statistical timing analysis," Proc. of the Design Automation Conf., 2004, pp. 331-336, and on the matching moments describe by C. E. Clark in "The Greatest of a Finite Set of Random Variables," Operations Research, Vol. 9, No. 2 (March-April), 1961, pp. 145-162, both of which are herein incorporated by reference in their entireties, one has:

$$\theta = (0 + \sigma^2 - 0)^{1/2} = \sigma \quad \text{(EQN. 5)}$$

$$\alpha = \frac{0-\mu}{\theta} = \frac{-\mu}{\sigma} \quad \text{(EQN. 6)}$$

$$\mu_0 = 0 + \mu\left[1 - \Phi\left(-\frac{\mu}{\sigma}\right)\right] + \theta\phi\left(-\frac{\mu}{\sigma}\right) = \quad \text{(EQN. 7)}$$

$$\mu\Phi\left(\frac{\mu}{\sigma}\right) + \sigma\phi\left(\frac{\mu}{\sigma}\right) = \sigma\left[\frac{\mu}{\sigma}\Phi\left(\frac{\mu}{\sigma}\right) + \phi\left(\frac{\mu}{\sigma}\right)\right] = \sigma[\lambda\Phi(\lambda) + \phi(\lambda)]$$

$$\mu_0^2 + \sigma_0^2 = 0 + (\mu^2 + \sigma^2)\left[1 - \Phi\left(-\frac{\mu}{\sigma}\right)\right] + \mu\theta\phi\left(-\frac{\mu}{\sigma}\right) = \quad \text{(EQN. 8)}$$

$$(\mu^2 + \sigma^2)\Phi\left(\frac{\mu}{\sigma}\right) + \mu\sigma\phi\left(\frac{\mu}{\sigma}\right) =$$

$$\sigma^2\left[\left(\frac{\mu^2}{\sigma^2} + 1\right)\Phi\left(\frac{\mu}{\sigma}\right) + \frac{\mu}{\sigma}\phi\left(\frac{\mu}{\sigma}\right)\right] =$$

$$\sigma^2[(\lambda^2+1)\Phi(\lambda) + \lambda\phi(\lambda)]$$

where $$\phi(x) = \frac{1}{\sqrt{2\pi}}\exp^{-0.5x^2}, \Phi(x) = \int_{-\infty}^{x}\phi(t)dt, \lambda = \frac{\mu}{\sigma}.$$

Equating $\sigma^2$ from EQNs. 7 and 8, one obtains:

$$\frac{\mu_0^2}{[\lambda\Phi(\lambda) + \phi(\lambda)]^2} = \frac{\mu_0^2 + \sigma_0^2}{(\lambda^2+1)\Phi(\lambda) + \lambda\phi(\lambda)} \quad \text{(EQN. 9)}$$

$$\Rightarrow \frac{(\lambda^2+1)\Phi(\lambda) + \lambda\phi(\lambda)}{[\lambda\Phi(\lambda) + \phi(\lambda)]^2} = \frac{\mu_0^2 + \sigma_0^2}{\mu_0^2}$$

The right-hand side of EQN. 9 is known, and a function $F(\lambda)$ is defined as the left-hand side of EQN. 9. Mathematically:

$$F(\lambda) = \frac{(\lambda^2 + 1)\Phi(\lambda) + \lambda\phi(\lambda)}{[\lambda\Phi(\lambda) + \phi(\lambda)]^2} \qquad \text{(EQN. 10)}$$

Thus, $F(\lambda)$ is a function of a single variable, namely, $\lambda$. It is also clear that $F(\lambda) \geq 1$, for any $\lambda$. Moreover, $F(\lambda)$ is a monotonically decreasing function (with slope strictly <0), and is thus a one-to-one function. This implies that the reconstruction is unique. $\lambda$ can now be computed using a combination of table lookup and binary search or alternate approaches. Using this value of $\lambda$ in EQN. 7, one can calculate $\sigma$, and subsequently $\mu$. From these values, it is trivial to reconstruct $X_2$.

The approach proposed by Visweswariah et al., infra, denotes Gaussian random variables using first order canonical forms with an independently random unit Gaussian associated with each variable. Mathematical operations (e.g., addition, subtraction, maximum, and minimum) on multiple canonical forms combine the independently random terms of the operands into a new independently random term that is associated with the final solution. This process prevents an exponential growth in the size of any canonical form but incurs loss in accuracy due to the approximation from the combination of several independently random terms. The procedure for a reversible max operation on canonical forms is slightly modified to counter the above approximation.

Without any loss of generality, canonical forms for two Gaussians, $X_1$ and $X_2$, and their maximum $X_m$ (computed using the approach proposed by Visweswariah et al., infra) are expressed as:

$$X_1 = \mu_1 + \sum_{i=1}^{N} c_{1i}\xi_i + r_1 R_1 \qquad \text{(EQN. 11)}$$

$$X_2 = \mu_2 + \sum_{i=1}^{N} c_{2i}\xi_i + r_2 R_2 \qquad \text{(EQN. 12)}$$

$$X_m = \mu_m + \sum_{i=1}^{N} c_{mi}\xi_i + r_m R_m \qquad \text{(EQN. 13)}$$

where, $\mu_1$ denotes the mean of the Gaussian $X_1$, each $\xi_i$ ($1 \leq i \leq N$) denotes one of N global independent unit Gaussians, $c_{1i}$ denotes the sensitivity of $X_1$ to $\xi_i$, $R_1$ denotes the independently random unit Gaussian associated with $X_1$, and $r_1$ the sensitivity of $X_1$ to $R_1$. The notations are similar for $X_2$ and $X_m$. Given canonical forms for $X_1$ and $X_m$, the invention seeks to reconstruct the canonical form for $X_2$ (which in turn involves computing $\mu_2$, each $c_{2i}$ and $r_2$) as follows:

$$X_0 = X_m - X_1 = (\mu_m - \mu_1) + \sum_{i=1}^{N}(c_{mi} - c_{1i})\xi_i + \sqrt{r_m^2 + r_1^2}\, R_0 \qquad \text{(EQN. 14)}$$

$$\mu_0 = \mu_m - \mu_1 \qquad \text{(EQN. 15)}$$

$$\sigma_0^2 = \sum_{i=1}^{N}(c_{mi} - c_{1i})^2 + r_m^2 + r_1^2 \qquad \text{(EQN. 16)}$$

The variance $\sigma_0^2$ is inaccurate due to approximations in $X_m$ (wherein, $r_m$ is computed approximately using a combination of $r_1$ and $r_2$). Under no approximation, the true variance can be shown to be:

$$\text{True}\,\sigma_0^2 = \sigma_0^2 - 2r_1^2 \Phi(\alpha) = \sigma_0^2 - 2r_1^2[1 - \Phi(\lambda)] \qquad \text{(EQN. 17)}$$

where, $\alpha$ and $\lambda$ are defined in EQN. 6 and EQN. 8. Applying this to EQN. 9 and EQN. 10, one obtains:

$$F(\lambda) = \frac{(\lambda^2 + 1)\Phi(\lambda) + \lambda\phi(\lambda)}{[\lambda\Phi(\lambda) + \phi(\lambda)]^2} = \frac{\mu_0^2 + \text{True}\,\sigma_0^2}{\mu_0^2} \qquad \text{(EQN. 18)}$$

$$\Rightarrow F(\lambda) = \frac{\mu_0^2 + \sigma_0^2 - 2r_1^2}{\mu_0^2} + \frac{2r_1^2}{\mu_0^2}\Phi(\lambda) \qquad \text{(EQN. 19)}$$

The only unknown term in the right hand side of EQN. 18 is $\Phi(\lambda)$, which is a monotonically increasing function bounded between zero and one. The right hand side of EQN. 18 is thus bounded and a monotonically increasing function. Since $F(\lambda)$ is a monotonically decreasing function, there is guaranteed to be one exact solution for $\lambda$ (assuming $X_1$ does not completely dominate $X_2$), which can be obtained very efficiently using standard root finding approaches. Using this value of $\lambda$ in EQN. 19, $\sigma$, and subsequently $\mu$ (as defined earlier), is calculated. From these values, the canonical form for $$X = X_2 - X_1 = \mu + \sum_{i=1}^{N} c_i \xi_i + rR$$

is reconstructed as follows:

$$c_i = \frac{c_{mi} - c_{1i}}{\Phi(\lambda)} \qquad \text{(EQN. 20)}$$

$$r = \sqrt{\sigma^2 - \sum_{i=1}^{N} c_i^2} \qquad \text{(EQN. 21)}$$

Finally, the canonical form for $$X_2 = \mu_2 + \sum_{i=1}^{N} c_{2i}\xi_i + r_2 R_2$$

is reconstructed as follows:

$$\mu_2 = \mu + \mu_1 \qquad \text{(EQN. 22)}$$

$$c_2 = c_i + c_{1i} \qquad \text{(EQN. 23)}$$

$$r_2 = \sqrt{r^2 - r_1^2} \qquad \text{(EQN. 24)}$$

The '−' sign in EQN. 24 is required to account for approximations in the independently random term r.

Embodiments of the present application have application in a variety of statistical timing and optimization operations. For example, during incremental timing, a previous maximum value is known, and a subset of input arcs must be "backed out", updated, and then "backed in" for the maximum operation. Embodiments of the present invention will achieve this goal efficiently and accurately, even in the case of high fan-in and high fan-out nets. This could apply equally to minimum operations (e.g., required arrival time calculations) in incremental timing. As a further example, yield computation (e.g., chip slack calculation) requires a very wide statistical minimum of all of relevant timing test slacks of an IC chip. When a change is made to the circuit, this wide statistical minimum operation can be repeated incrementally in accordance with embodiments of the present invention.

Figure 3:
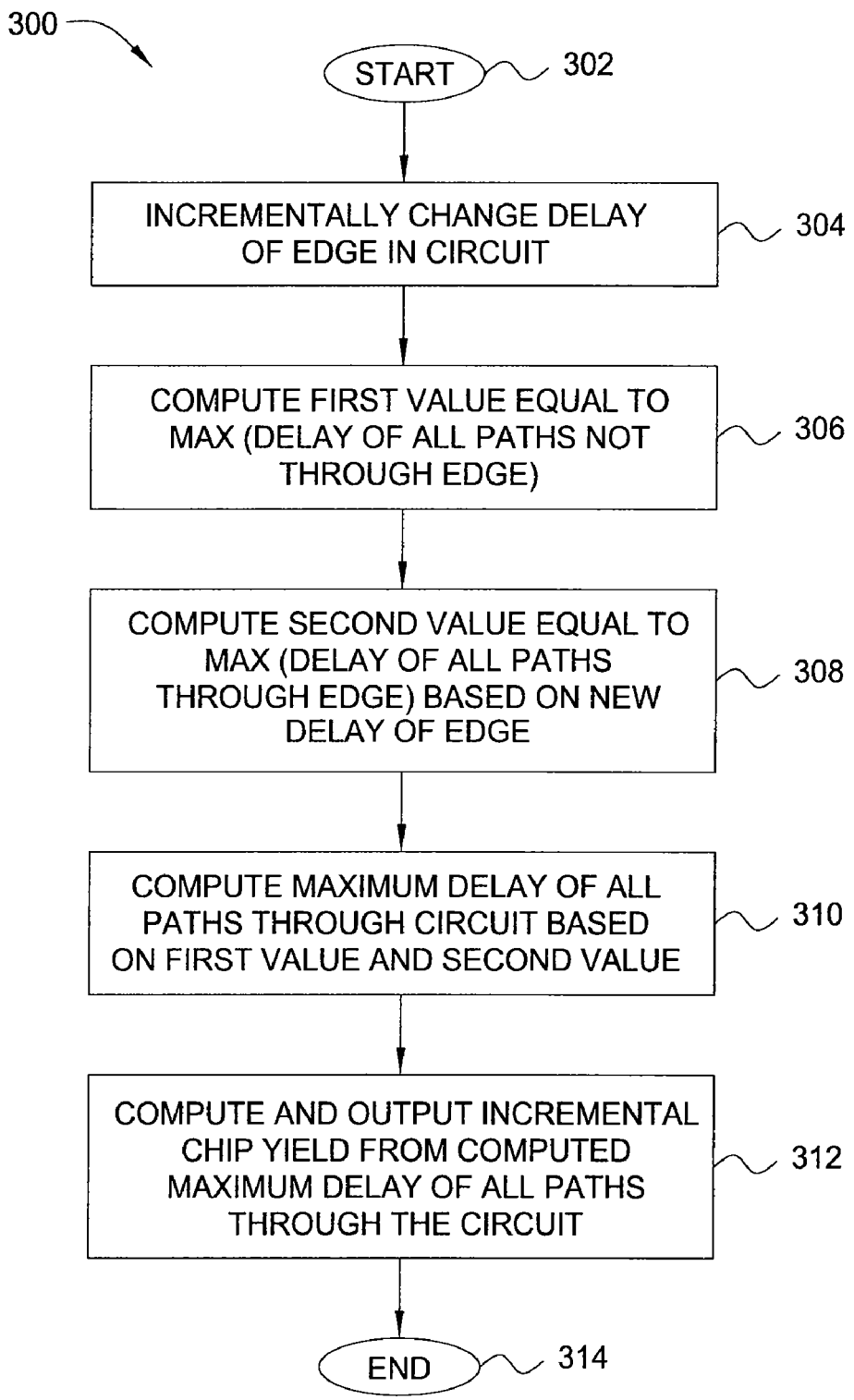
FIG. 3 is a flow diagram illustrating one embodiment of the method for incrementally computing the yield of a circuit.

As a still further example, embodiments of the present invention may be applied to yield prediction operations. FIG. 3, for example, is a flow diagram illustrating one embodiment of the method 300 for incrementally computing the yield of a circuit.

The method 300 is initialized at step 302 and proceeds to step 304, where the method 300 incrementally changes only the propagation delay $d_e$ across an edge e in the circuit to $d_e^{new}$. The edge e is bounded by node a and node b in a timing graph of the circuit. In this instance, Y=statistical maximum of all path delays in the circuit, which in turn can indicate the chip timing yield. One can write this as:

$$Y = \max(\max(\text{delay of all paths through } e), \quad \text{(EQN. 25)}$$
$$\max(\text{delay of all paths not through } e)) =$$
$$\max(AT_a + d_e - RAT_b, \max(\text{all paths not through } e)$$

where $AT_a$ denotes the arrival time at node a, and $RAT_b$ denotes the requires arrival time at node b.

In step 306, the method 300 computes a first value equal to the statistical maximum of all path delays for paths in the circuit that do not go through the edge e. Embodiments of the present invention can be used to reverse the maximum operation of EQN. 25 and compute the statistical maximum of all paths not through e. The method 300 then proceeds to step 308 and computes a second value equal to the statistical maximum of all path delays for paths that do go through the edge e, in accordance with the new delay, $d_e^{new}$. Thus, the second value is computed as max(delay of all paths through e)=max($AT_a+d_e^{new}-RAT_b$).

In step 310, the method 300 computes the statistical maximum of all path delays through the circuit (i.e., the statistical maximum of the first value and the second value). The method 300 then proceeds to step 312 and outputs the statistical maximum of all path delays through the circuit, which is used to predict the new yield of the circuit, before terminating in step 314. Thus, the entire incremental yield computation embodied in the method 300 requires just two binary maximum operations and can be achieved extremely efficiently, with substantially no timing propagation effort.

Figure 4:
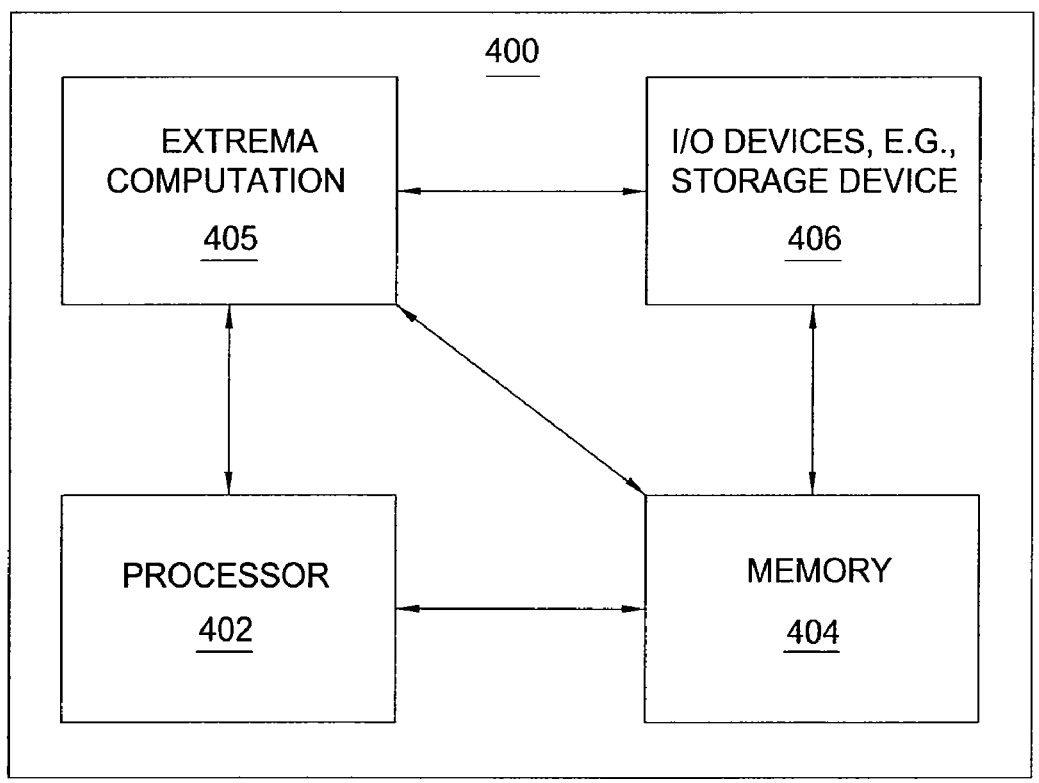
FIG. 4 is a high-level block diagram of the extrema computation method that is implemented using a general purpose computing device.

FIG. 4 is a high-level block diagram of the extrema computation method that is implemented using a general purpose computing device 400. In one embodiment, a general purpose computing device 400 comprises a processor 402, a memory 404, an extrema computation module 405 and various input/output (I/O) devices 406 such as a display, a keyboard, a mouse, a stylus, a wireless network access card, and the like. In one embodiment, at least one I/O device is a storage device (e.g., a disk drive, an optical disk drive, a floppy disk drive). It should be understood that the extrema computation module 405 can be implemented as a physical device or subsystem that is coupled to a processor through a communication channel.

Alternatively, the extrema computation module 405 can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the extrema computation module 405 for computing the incremental extrema of n random variables, as described herein with reference to the preceding Figures, can be stored on a computer readable storage medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A method for determining an incremental extrema for a set of n random variables, given a change to at least one of the n random variables from a first value to a second value, the method comprising:

obtaining the n random variables;

obtaining a first extrema for the n random variables, the first extrema comprising an extrema computed prior to the change to the at least one of the n random variables;

removing the at least one of the n random variables to form an (n−1) subset;

computing a second extrema for the (n−1) subset in accordance with the first extrema and the first value of the at least one of the n random variables; and outputting a third extrema computed as an extrema of the second extrema and the second value of the at least one of the n random variables as the incremental extrema for the set of n random variables, wherein at least one of the removing or the computing is performed using a processor.

2. The method of claim 1, wherein a plurality of the n random variables is changed, each of the plurality of the n variables being changed from a respective first value to a respective second value, and wherein the method further comprises:

performing one or more iterations of said obtaining the n random variables, obtaining a first extrema, said removing, said computing, and said outputting, wherein during each of said one or more iterations one of the plurality of n random variables is removed during the removing.

3. The method of claim 1, wherein the incremental extrema is a minimum value of the set of n random variables.

4. The method of claim 1, wherein the incremental extrema is a maximum value of the set of n random variables.

5. The method of claim 1, wherein the n random variables comprise timing data for an integrated circuit chip.

6. The method of claim 5, wherein the change to the at least one of the n random variables is the result of an incremental change made to the integrated circuit chip.

7. The method of claim 6, wherein the incremental change comprises one of: buffer insertion, pin swapping, layer assignment, or cell sizing.

8. The method of claim 5, wherein the method is implemented in accordance with an incremental timing operation.

9. The method of claim 5, wherein the method is implemented in accordance with a yield computation operation.

10. The method of claim 5, wherein the method is implemented in accordance with a yield prediction operation.

11. The method of claim 5, wherein the method is implemented in accordance with a chip slack computation operation.

12. A computer readable storage device containing an executable program for determining an incremental extrema for a set of n random variables, given a change to at least one of the n random variables from a first value to a second value, where the program performs the steps of:
obtaining the n random variables;
obtaining a first extrema for the n random variables, the first extrema comprising an extrema computed prior to the change to the at least one of the n random variables;
removing the at least one of the n random variables to form an (n−1) subset;
computing a second extrema for the (n−1) subset in accordance with the first extrema and the first value of the at least one of the n random variables; and
outputting a third extrema computed as an extrema of the second extrema and the second value of the at least one of the n random variables as the incremental extrema for the set of n random variables.

13. The computer readable storage device of claim 12, wherein a plurality of the n random variables is changed, each of the plurality of the n variables being changed from a respective first value to a respective second value, and wherein the method further comprises:
performing one or more iterations of said obtaining the n random variables, obtaining a first extrema, said removing, said computing, and said outputting, wherein during each of said one or more iterations one of the plurality of n random variables is removed during the removing.

14. The computer readable storage device of claim 12, wherein the incremental extrema is a minimum value of the set of n random variables.

15. The computer readable storage device of claim 12, wherein the incremental extrema is a maximum value of the set of n random variables.

16. The computer readable storage device of claim 12, wherein the n random variables comprise timing data for an integrated circuit chip.

17. The computer readable storage device of claim 16, wherein the change to the at least one of the n random variables is the result of an incremental change made to the integrated circuit chip.

18. The computer readable storage device of claim 17, wherein the incremental change comprises one of: buffer insertion, pin swapping, layer assignment, or cell sizing.

19. The computer readable storage device of claim 16, wherein the method is implemented in accordance with an incremental timing operation.

20. The computer readable storage device of claim 16, wherein the method is implemented in accordance with a yield computation operation.

21. The computer readable storage device of claim 16, wherein the method is implemented in accordance with a yield prediction operation.

22. The computer readable storage device of claim 16, wherein the method is implemented in accordance with a chip slack computation operation.

23. A method for computing an incremental yield of a circuit, the method comprising:
changing a delay across an edge in the circuit;
computing a first value equal to a statistical maximum of path delays for paths not going through the edge;
computing a second value equal to a statistical maximum of path delays for paths going through the edge;
outputting a statistical maximum of the first value and the second value as the maximum of all paths delays in the circuit; and
predicting the incremental yield of the circuit in accordance with the maximum of all paths delays in the circuit
wherein at least one of: the changing, the computing the first value, the computing the second value, or the predicting is performed using a processor.

24. A method for determining an extrema for an (n−1) subset of a set of n random variables, given an extrema for the set of n random variables, the method comprising:
obtaining the n random variables;
obtaining the extrema for the n random variables;
removing one of the n random variables to form the (n−1) subset; and
computing the extrema for the (n−1) subset in accordance with the extrema of the set of n random variables and a value of the one of the n random variables that is removed,
wherein at least one of the removing or the computing is performed using a processor.

* * * * *